United States Patent
Boesch et al.

(10) Patent No.: US 6,748,902 B1
(45) Date of Patent: *Jun. 15, 2004

(54) SYSTEM AND METHOD FOR TRAINING OF ANIMALS

(75) Inventors: Brian Boesch, 2939 Fort Lee St., Oak Hill, VA (US) 20171; Jon L. Roberts, Great Falls, VA (US)

(73) Assignee: Brian Boesch, Oak Hill, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 199 days.

(21) Appl. No.: 09/591,167

(22) Filed: Jun. 9, 2000

(51) Int. Cl.[7] ............................................. A01K 15/02
(52) U.S. Cl. ....................................... 119/719; 119/721
(58) Field of Search ..................... 119/719–721, 905, 119/908; 340/573.1, 573.3

(56) References Cited

U.S. PATENT DOCUMENTS

| | | | | |
|---|---|---|---|---|
| 4,802,482 A | * | 2/1989 | Gonda et al. ................. | 119/29 |
| 4,898,120 A | * | 2/1990 | Brose .......................... | 119/29 |
| 5,067,441 A | * | 11/1991 | Weinstein .................... | 119/29 |
| 5,844,489 A | * | 12/1998 | Yarnall, Jr. et al. ......... | 340/573 |
| 5,870,973 A | * | 2/1999 | Touchton et al. ............. | 119/721 |
| 6,019,066 A | * | 2/2000 | Taylor .......................... | 119/720 |
| 6,047,664 A | * | 4/2000 | Lyerly .......................... | 119/719 |
| 6,064,308 A | * | 5/2000 | Janning et al. ........... | 340/573.3 |
| 6,131,535 A | * | 10/2000 | So .............................. | 119/719 |
| 6,135,060 A | * | 10/2000 | So .............................. | 119/720 |
| 6,155,208 A | * | 12/2000 | Schell et al. ................ | 119/720 |
| 6,163,261 A | * | 12/2000 | Westrick ................... | 340/573.3 |
| 6,166,643 A | * | 12/2000 | Janning et al. ........... | 340/573.3 |
| 6,167,843 B1 | * | 1/2001 | Kim ............................ | 119/720 |
| 6,170,439 B1 | * | 1/2001 | Duncan et al. ............. | 119/720 |
| 6,184,790 B1 | * | 2/2001 | Gerig ....................... | 340/573.3 |
| 6,191,693 B1 | * | 2/2001 | Sangsingkeow ......... | 340/573.3 |
| 6,230,661 B1 | * | 5/2001 | Yarnall, Jr. et al. ......... | 119/721 |
| 6,360,698 B1 | * | 3/2002 | Stapelfeld et al. .......... | 119/720 |

* cited by examiner

Primary Examiner—Charles T. Jordan
Assistant Examiner—K. Smith
(74) Attorney, Agent, or Firm—Roberts Abokhair & Mardula, LLC

(57) ABSTRACT

An animal training device for administering audio and physical encouragement to an animal. An animal worn device comprising sod and shock producing elements is attached to a leash or lead. A transducer or similar strength measuring means is connected to the shock and sound producers of the animal worn device. The leash or lead is connected to the transducer. As the animal pulls of the lead, the transducer measures the strength of the pull. When the pull strength of the naimal reaches a first level, an audio tone is sounded. If the strength of pull exceeds a second level a shock is administered to the animal. In this fashion the animal learns not to pull to hard on a lead. In an alternate embodiment, the trainer has a transmitter with variable signal strength. The animal worn device had a receiver that senses the signal strength. IF the signal strength drops to a preset limit indicative of distance from the transmitter, a tone is sounded. Further signal drop results in the a shock being delivered. Again in this way the animal learns the distance from the trainer that the animal can go without some form of restraint.

12 Claims, 6 Drawing Sheets

SYSTEM AND METHOD FOR TRAINING OF ANIMALS

FIELD OF THE INVENTION

This invention relates generally to training of animals. More particularly the present invention is a form of electronic leash and training aid for animals.

BACKGROUND OF THE INVENTION

Animal training particularly household pets such as dogs requires a great deal of patience. Further the training of dogs in particular has been the subject of many books for both owners as well as professional trainers regarding how to best train an animal to obey the wishes of its owner.

In the field of training, various devices have been invented which are designed to keep animals within a confined area. For example the now ubiquitous "electronic fence" is seen everywhere as a means of keeping animals within a specific area. The electronic fence comprises a wire surrounding an area in which an animal is to be confined. An electronic current placed on the wire giving it a magnetic field and/or the wire is used as an RF transmitter. A collar is then attached to the animal which is capable of sensing the electronic field. When the strength of the electronic field is at a certain level, an audible warning is given to the animal. As the animal gets closer to the buried wire, an electronic shock is administered to the animal thereby providing a physical incentive for the animal to stay away from the buried electrical wire. Over a training period of time, the animal become becomes familiar with the meaning of the audible sound and the general location of the buried wire. In this fashion the animal is trained to stay within a confined area by virtue of the audible signal and the electronic shock in the event that the animal gets too close to the buried wire.

However, animal owners can not carry a buried wire wherever they go. As a result teaching an animal to "heel" must be accomplished by means of leashes and other physical means.

Animal control devices of various types have been the subject of much invention. For example, U.S. Pat. No. 5,425,330 to Touchton, et al. was issued for a "Animal Control Device." This invention discloses an animal worn radio signal receiver having appropriate electronics to receive a signal from an antenna and to administer both audible stimulation and electrical stimulation.

U.S. Pat. No. 4,898,120 was issued to Brose for an "Animal Training and Restraining System." This patent also shows a collar worn device having an antenna receiver controller and high voltage generator to administer a shock to an animal. This invention relies upon the fact that electrical field strength with a receiving antenna decreases with distance from a transmitter. This invention relies upon a stationary transmitter to provide the appropriate signal. A shock is administered to the animal that strays beyond a distance from the transmitter.

U.S. Pat. No. 5,642,690 was issued to Calabrease, et al. for a "Animal Containment System." This invention also relies upon field strength changes to administer a shock to an animal based upon an animal worn device. Transmitters are stationary in defined locations where the animal is permitted and not permitted to go.

U.S. Pat. No. 5,067,441 to Weinstein was issued for a "Electronic Assembly for Restricting Animals to Defined Areas." This patent describes a form of electronic fence and control device. The control device is worn by the animal and is combined with a radio frequency transmitter for generating radio signals. When the animal strays too close to a wire having a certain field strength a shock is delivered to the animal via an animal worn device. A provision is made for both audible stimulation and electrical stimulation when an animal strays too close to the limits of a defined area.

U.S. Pat. No. 5,353,744 was issued to Custer for an "Animal Control Apparatus." This represents another invention comprising an animal worn device with an electrode for providing a shock to the animal. This system comprises a perimeter wire placed at the boundary of a defined space which sends a signal through the perimeter wire to generate a coded field. When the animal strays too close to the buried wire the collar delivers a electrical shock stimulus to the animal. This system is generally stationary with the receiver carried by the animal.

U.S. Pat. No. 5,844,489 was delivered to Yarnall, et al. for an "Electronic Confinement System for Animals or People Transmitting Digitally Encoded Signals." This invention is yet another electronic containment system wherein the animal of person wears a transceiver which also delivers an audible signal, a deterring shock or both when the person or animal leaves a predefined area. A stationary home base station detects and reads data transmitted from the transceiver. Again, one of the embodiments of this invention comprises a buried wire for defining a perimeter. Again a stationary system for transmission with, in this instance a transceiver, being worn by the individual or animal to be controlled.

U.S. Pat. No. 5,868,100 was issued to Marsh for a "Fenceless Animal Control System Using GPS Location Information." In this case the animal worn unit comprises a GPS receiver, transmitter, and a programming unit that allows a person to program the location for a particular boundary in geographic terms. When a GPS signal is received that indicates the animal is near a predefined boundary, an electrical stimulation is administered. Thus the animal worn device in this instance comprises the stimulation means but also comprises a GPS receiver combined with an audible signal and electrical shock generation means.

U.S. Pat. No. 4,335,682 to Gonda et al. was issued for an "Animal Training Apparatus." This unit again comprises an animal worn device capable of receiving an electronic signal and applying an adverse electrical stimulus and audible signal to control an animal. This invention discloses a portable transmitter which has certain buttons for administering sound, shock, and combination of both upon a specific actuation by the animal trainer. Various stimuli administered to an animal are administered only in response to push buttons that are depressed.

U.S. Pat. No. 4,802,482 to Gonda was issued for "Method and Apparatus for Remote Control of Animal Training Stimulus." Again a portable transmitter cooperates with an animal worn receiver which applies stimulation to the skin of the animal. In this instance the portable unit allows a trainer to select a stimulus to be applied to the animal when the trainer desires.

U.S. Pat. No. 5,605,116 was issued to Kim, et al. for an "Electrical Animal Training System." This invention comprises a hand held transmitter which controls a receiver unit which is attached to a collar worn by an animal to be trained. In this case voice commands are communicated to an animal via a speaker which is associated with the receiving unit which is worn by the animal. In the event that the animal disobeys a particular command, negative reinforcement is provided in the form of a mild electrical shock.

U.S. Pat. No. 5,054,428 was issued to Farkus for a "Method and Apparatus for a is Remote Conditioned Cue Control of Animal Training Stimulus." Again this particular invention comprises an animal worn device for delivering audible or electrical stimulation to an animal if it fails to conform to expected behavior. A portable transmitter sends the signal that is desired by the animal trainer. Again in this instance the animal trainer takes positive action to transmit a RF control signal to the collar mounted receiver simulator unit.

U.S. Pat. No. 5,857,433 was issued to Files for an "Animal Training and Tracking Device having a Global Positioning Satellite Unit." This invention is yet another form of a GPS receiver type device. The animal worn GPS receiver comprise both the GPS system and an adverse stimuli administering circuitry to shock the animal wearing the device. Thus not only can animal control be administered but the animal can be tracked as well. Adverse stimuli is applied using a hand held remote control unit to adversely stimulate the animal wearing the collar. The hand held unit determines the GPS position of the animal and administers a stimuli as desired by the trainer. Thus the position of the trainer and the position of the animal are calculated and the shock is administered by the trainer when desired.

U.S. Pat. No. 5,465,687 was issued to Custer for a "Animal Control Apparatus." This invention is designed for confining the movement of an animal to a defined area. A radio signal is transmitted through an antenna that defines the area. This system is a form of buried wire system which defines a perimeter by virtue of the buried wire. A signal is sent through the buried wire such that when a animal approaches the wire, a collar worn receiver administers a mild electrical shock to the animal.

U.S. Pat. No. 5,381,129 to Boardman was issued for a Wireless Pet Containment System." Again an animal worn device receives a signal from a transmitter. The animal worn receiver has a means to administered a stimulus to the animal. Both audible and electrical shock stimulus are administered to the animal when there is an electrical indication of a signal loss as when the animal wanders away from a predefined area. A fixed antenna transmits an RF signal to the collar worn device.

U.S. Pat. No. 5,533,469 was issued to Touchton et al. for a "Programming Apparatus for Programmable Animal Control Device." Again an animal worn control device has a receiver which receives a radio signal and a transducer for applying a stimulus to the animal in response to the signal. This invention addresses the programming apparatus associated with a programmable animal control device. This control device allows operating frequency of the receiver to be controlled the type and intensity of shock and audio stimulus as well as related perimeters.

Thus it can be seen that much of the background art discloses animal collars and their circuitry, means for applying electrical shocks and audible stimuli to the animal worn device, a wide variety of "buried wire" systems together with associated stationary transmitters. All of which circuitry is disclosed in the references cited. Further several instances of portable transmitters are also illustrated for control of GPS, and for allowing animal trainers to administer shocks to animals when desired. Much of the circuitry in the references cited will be known by those skilled in the art to be applicable to the present invention.

However, What would be truly useful would be a system that comprises a form of "electronic leash" or training device which can be variably preset by an animal owner and operated in automatic mode to help train and control an animal when the owner and animal are moving such as when the owner is walking the animal. Such a system and method would allow the training of an animal to take place regardless of the location of the owner. Such a system would allow an owner to train an animal in the animal's own backyard and, when the owner and the animal are in another location other than the home. Such a system would be portable and operate without the need of a connection to household current at all times.

SUMMARY OF THE INVENTION

It is therefore an objective of the present invention to be able to train animals.

It is a further objective of the present invention to train animals regardless of the location of where the owner and animal happen to be.

It is yet another objective of the present invention to train animals without the need for a leash.

It is still another objective of the present invention to train animals without the need for an electrical connection to a household current.

It is still another objective of the present invention to train animals using wireless technology.

It is further objective of the present invention to allow wireless animal training apparatus to be adjustable so that various ranges for animal motion can be set.

These and other objectives of the present invention will become apparent from a review of the specification that follows.

The present invention comprises a system and method for the training of animals. The present invention comprises two basic elements. First element is the trainer device (TD). The trainer device is the device that is held by the trainer and has variable settings as will be more fully explained.

The second element of the invention is the animal device (AD). The animal device is basically a receiver as will be more fully explained below.

The trainer device comprises a power supply which can be a rechargeable or single use battery. The power supply supplies power to a processor which has certain variable settings as may be desired by the trainer. The processor is connected to an RF transmitter which transmits a radio signal which has a limited range.

For purposes of training, the trainer may desire to set a range at which alarms of various types may be created for the animal being trained. This allows essentially a distance radius over which an animal may move before an alarm is given to the animal. This distance radius is variably set in the training device by the trainer. Thereafter the processor provides appropriate energy to the transmitter to allow the desired radius distance to be set.

In the beginning of a training session, the trainer may desire the animal to be kept very close in radius distance to the trainer. Once the animal is trained, the trainer can extend the radius distance by a simple setting on the training device.

The second element of the present invention is the animal device (AD). The AD comprises a power supply which can be a rechargeable or single use battery. The animal device is worn as a collar around the animal so that the appropriate signals and physical encouragement can be applied. The animal device further comprises a receiver having the ability to measure signal strength. When signal strength is high, no audible or other physical indicator is given to the animal.

When the receiver senses a signal strength at some intermediate level, an audible warning is given to the animal that it should not stray further from the trainer. If the signal strength descends to a low level, a physical "encouragement" in the form of a shock is given to the animal so that it does not stray farther from the trainer.

While training may initially occur with the use of some physical means such as a leash in order to both provide a physical feedback that is accompanied by the audible feedback, eventually the training device of the present invention will be able to be used without a physical restraining means by the trainer.

DETAILED DESCRIPTION OF THE INVENTION

Figure 1:
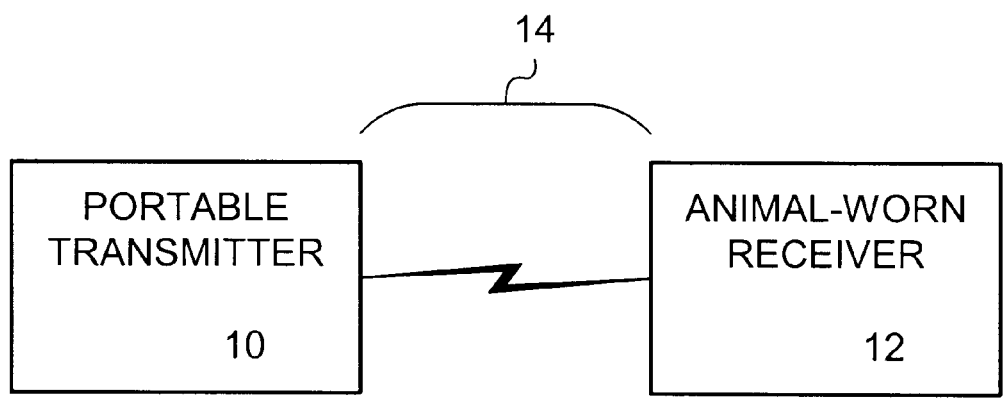
FIG. 1 illustrates the overall architecture of the present invention including the training device and the receiver.

As noted above, the present invention comprises both a system and method for animal training using a wireless training device and animal device. Referring first to FIG. 1 a generalized architecture of the present invention is illustrated. The trainer carries the training device 10 which comprises a transmitter for transmitting an RF signal to an animal device 12 worn by the animal. The radius distance 14 is configurable by the trainer.

Figure 2:
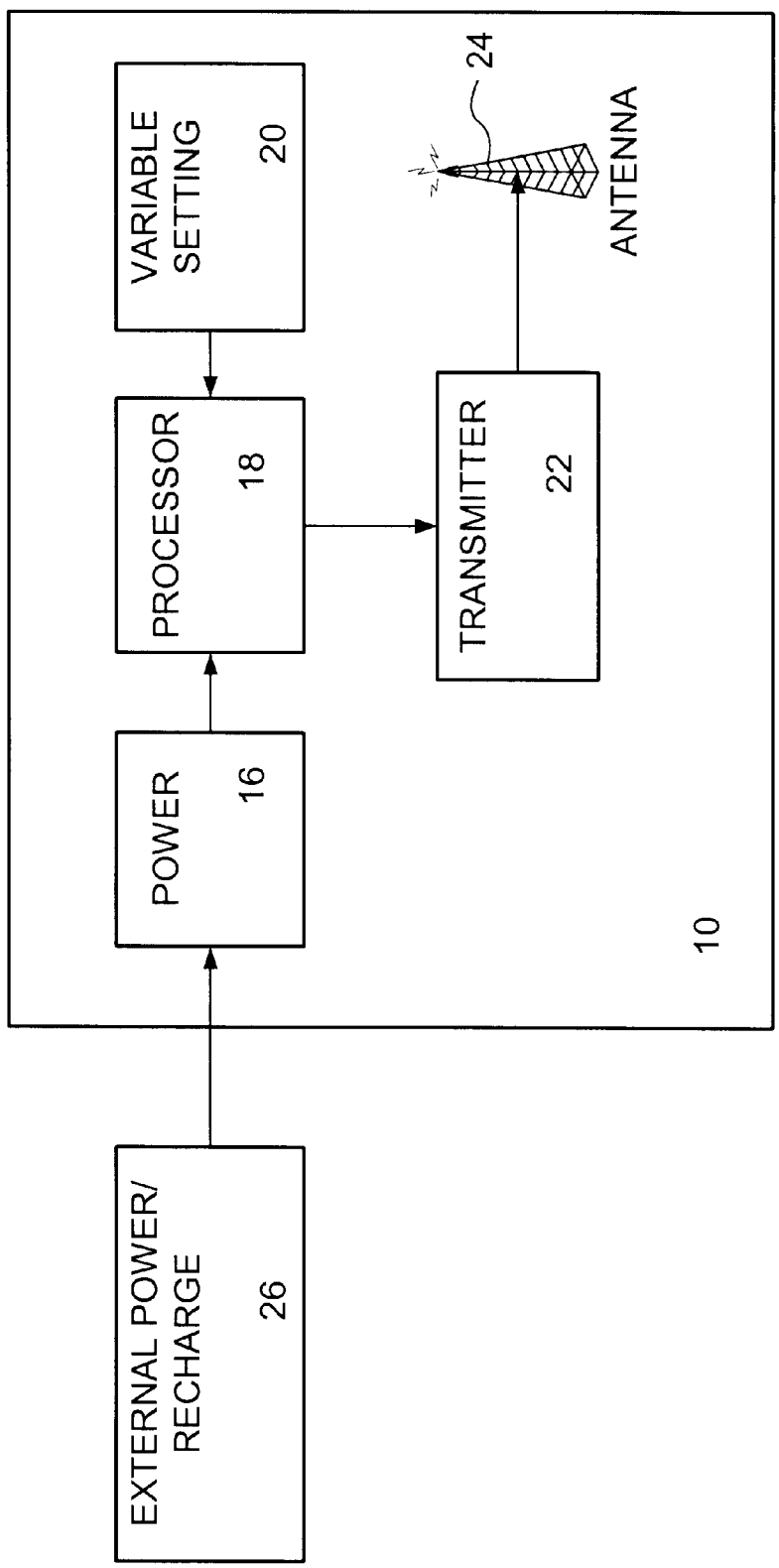
FIG. 2 illustrates a general schematic of the training device.

Referring to FIG. 2 the training device of the present invention is generally illustrated. Training device 10 comprises a power supply 16 which can be either a rechargeable or single use battery. In the event that the battery is a rechargeable one, the training device can be recharged with household current 26 or the battery can be removed from the unit and charged in a charger connected to household current.

The power supply is connected to a micro processor 18 which comprises processing capability and for storage of variable parameters. The variable parameters are input by a variable setting means 20 which can be a dial, digital setting or other types of setting means known in the art. When the trainer desires to set a specific radius distance, such a distance in input in the variable setting 20 thus providing instructions to the processor 18.

Once the processor receives settings on the desired radius distance, the signal is sent to the transmitter 22 to apply the appropriate power to the transmission as instructed by the processor 18. A signal is then transmitted over antenna 24 which can then be received by the animal device 12. Depending upon the radius distance set by the trainer, the transmitted signal will be stronger or weaker as desired.

Figure 3:
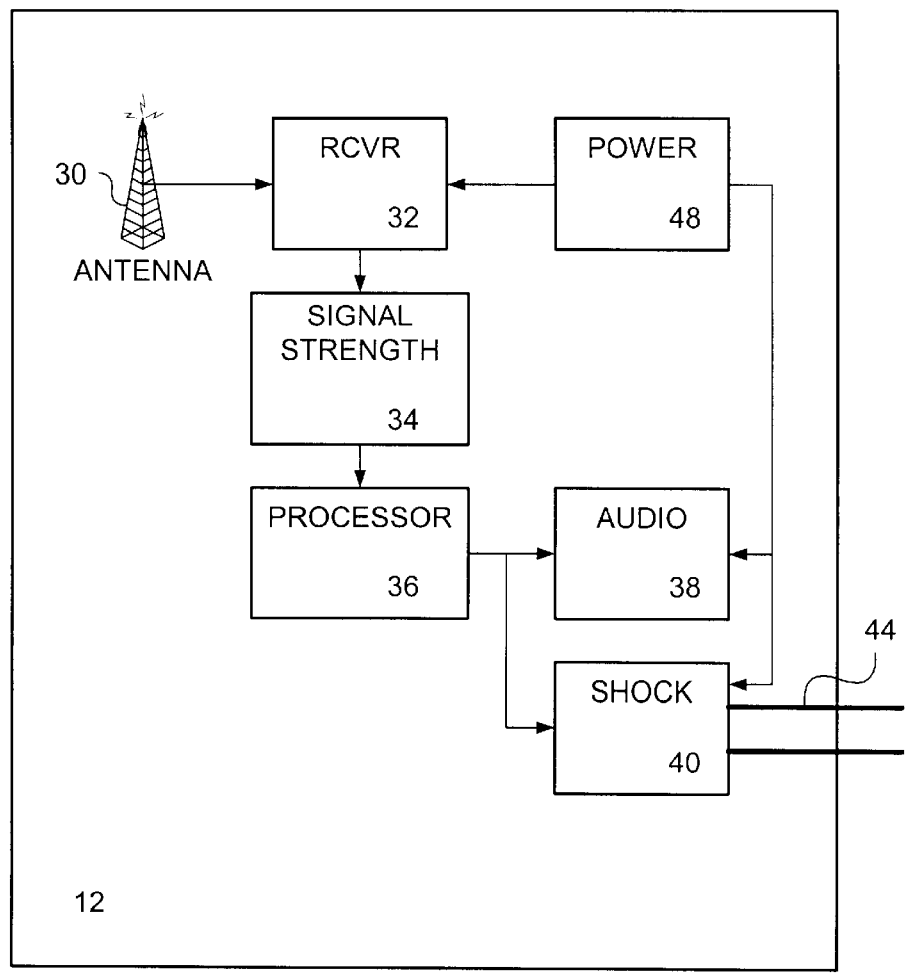
FIG. 3 illustrates a general schematic of the animal device.

Referring to FIG. 3, the animal device is illustrated. Animal device 12 is a self contained unit that is worn on a collar or other attachment to the animal. For example, a horse may have the animal device in some form of harness whereas a dog may have it in the form of a collar. The method of affixing the animal device to the animal is not meant as a limitation. Any means known in the art for affixing devices to animals is satisfactory for the present invention.

Animal device 12 receives the signal from training device 10 via an antenna. 30. The antenna is connected to an internal receiver 32 which has the capability of receiving and digitizing the signal strength 34 so that the signal strength can be determined. Once the signal strength 34 is determined it is provided to a micro processor 36 in the animal device. Micro processor 36 interprets the signal strength and, depending upon the level of the signal strength, sends a signal to an audible alarm 38 which in turn powers a speaker 42 which provides an audible signal to the animal when the signal strength is at some intermediate or warning level.

If the animal continues to wander further after hearing the audible alarm, the receiver 32 continually senses signal strength 34 and provides the appropriate digital signal to processor 36 that the signal is below a certain level indicative of a further radius distance from the trainer. When the signal strength drops below a certain level indicative that the animal has wandered farther than the trainer would desire, and beyond the audible signal 38 a signal is sent to an electric current generator 40 which then applies an electrical current via electrodes 44 to the animal administering a mild shock thereby providing a physical "encouragement" to the animal to return to the appropriate radius distance from the trainer.

The animal device also can operate from single use or rechargeable batteries 48 which provides power to the animal device. If rechargeable batteries are used, the entire unit can be plugged into household current or the batteries can be removed and recharged in a battery charger.

Figure 4:
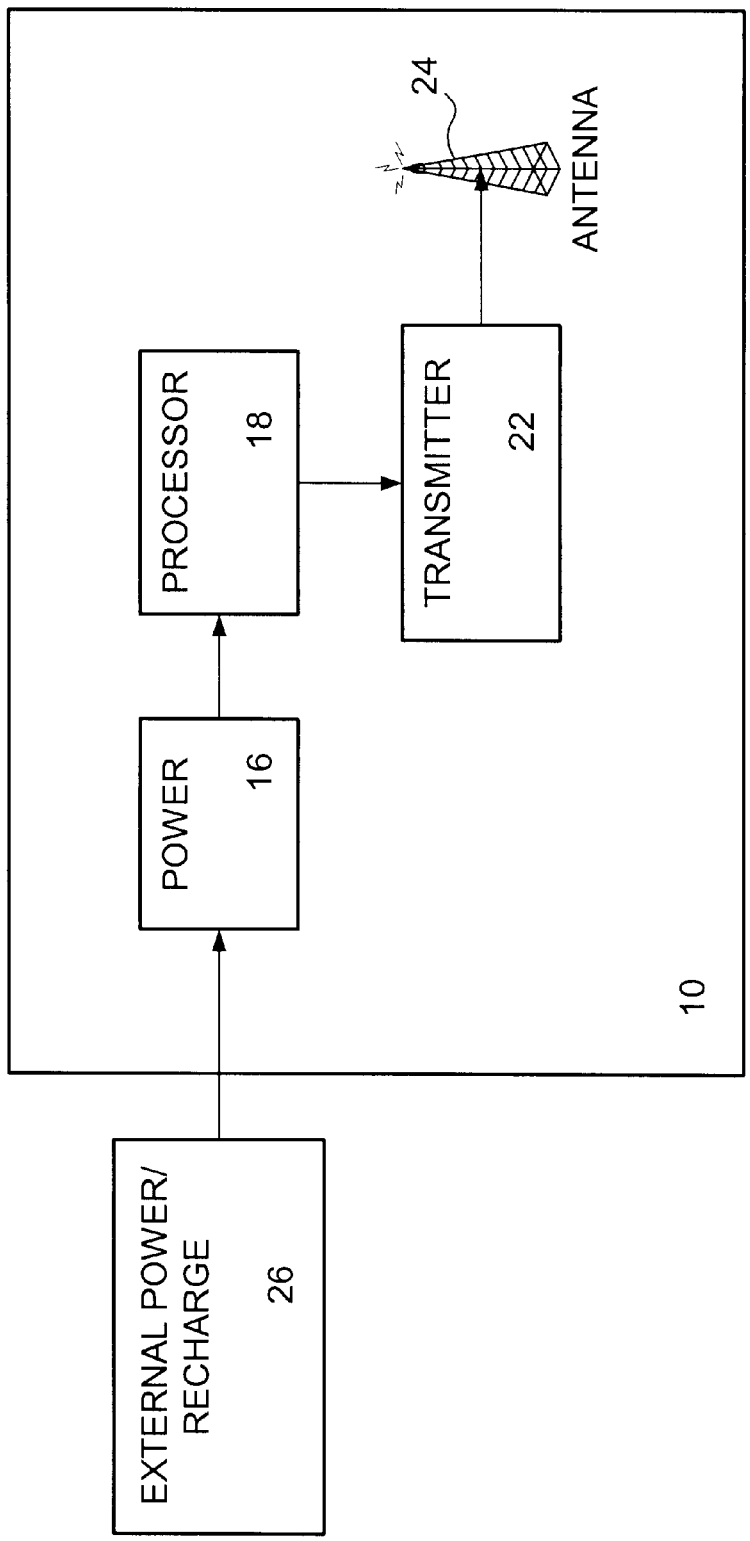
FIG. 4 illustrates an alternative embodiment of the present invention

Referring to FIG. 4 an alternative embodiment of the present invention is illustrated. In this instance the variable setting is established by virtue of setting a radius distance on the animal device rather than on the trainer device. Thus FIG. 4 illustrates the trainer device having a somewhat more simplified architecture comprising a power supply 16 connected to a transmitter 22 which transmit over an antenna 24. Thus the need for a variable power setting in the transmitter is eliminated.

Figure 5:
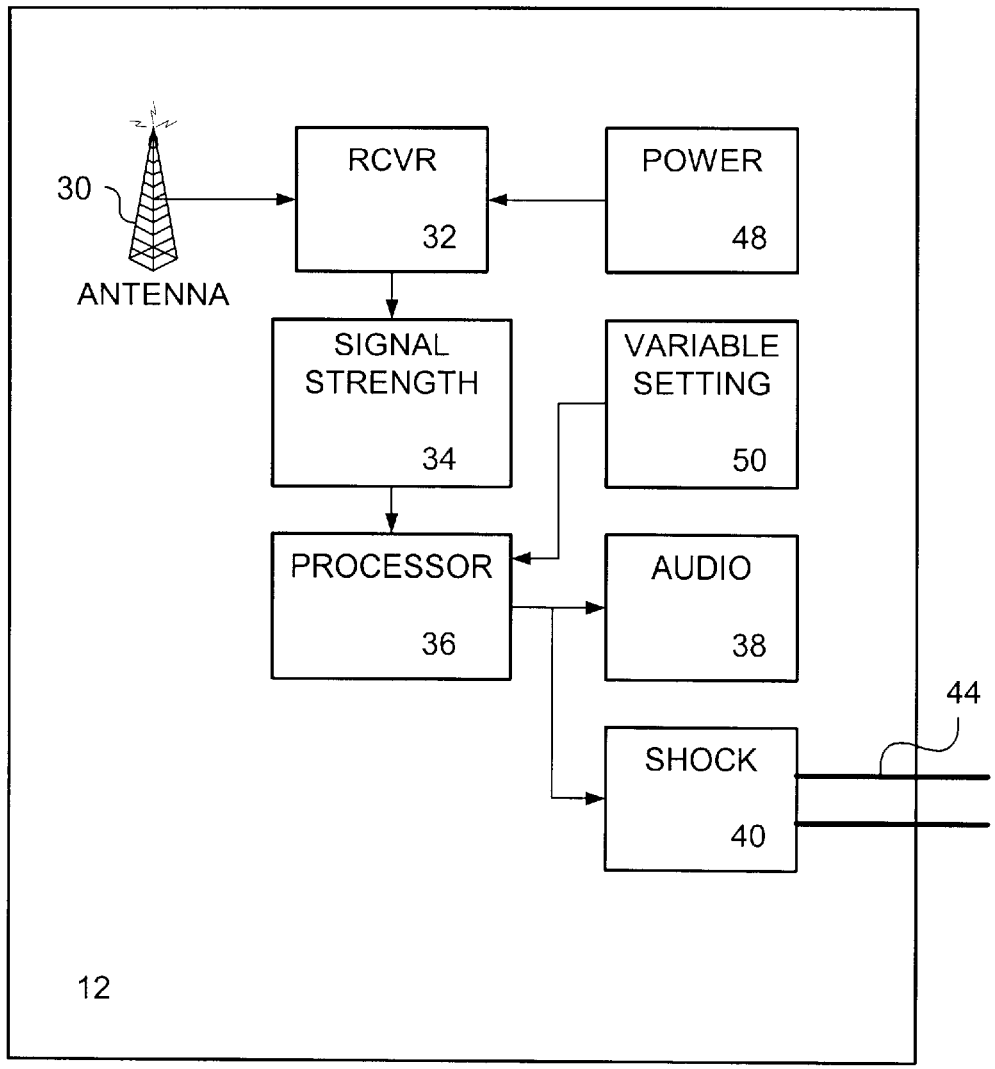
FIG. 5 illustrates the animal-worn portion of the device of the present invention

Referring to FIG. 5 the animal-worn portion of the device of the present invention is illustrated. In this instance animal device 12 comprises an antenna 30 which is connected to a receiver 32 in turn is powered by battery 48. The receiver 32 calculates signal strength 34 which inputs the signal strength information to processor 36. In this instance however the processor can receive variable settings from a variable input device 50. This device sets various levels within processor 36 indicative of the radius distance which the trainer desires to have and at which outer limits of radius distance signals an physical encouragements are provided to the animal. Once the variable setting is set 50 on the animal device 12 the processor 36 constantly monitors the signal strength 34 to determine whether an audible feedback to the animal should be given. If audible feedback is to be given 38 a tone is provided over speaker 42 to the animal. If the signal strength drops below a certain level as set by the variable setting 50 a shock is administered 40 to the animal over electrode 44.

As noted above part of the animal training process may require some physical restraint such as a leash in order to have the animal associate various distances with tones and shocks. However, once the animal learns of the various audible and physical signals, training can continue without the physical restraining means.

Figure 6:
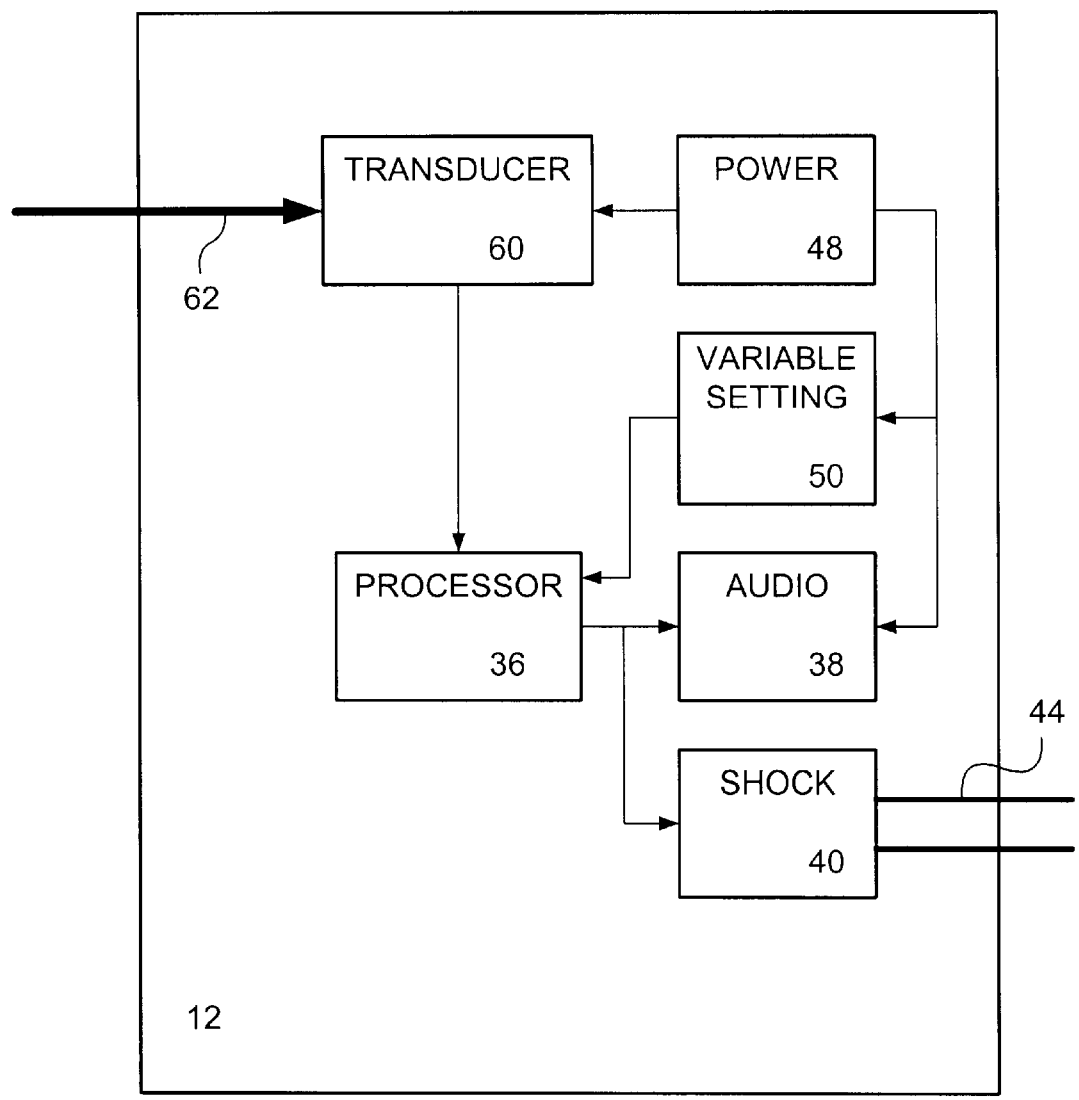
FIG. 6 illustrates a leash embodiment of the present invention.

To further assist in training the animal and as noted above the animal worn portion of the present invention can also receive strength signals based upon the strength with which the animal pulls on the leash or lead of the owner. Referring to FIG. 6 the leash or lead embodiment of the animal-worn portion of the device of the present invention is illustrated. In this instance animal device 12 comprises a transducer 60 connected physically to the leash or lead either directly to the leash or via a transducer on the animal collar connected to the remaining circuitry of the present invention. The transducer or other similar strength measuring gauge such as spring, strain gauges or any other device capable of measuring and sensing the pull place on the leash or lead by the animal. The transducer is and the remaining portions of the system are powered by battery 48. The transducer 60 measures the signal strength placed on the leash by the animal and inputs the signal strength information to processor 36. In this instance however the processor can receive variable settings from a variable input device 50. This device sets various levels within processor 36 indicative of the strength of pull, and the limits, which the trainer desires to have and at which limits of pull a physical and/or audio encouragement is provided to the animal. Once the variable setting is set 50 on the animal device 12 the processor 36 constantly monitors the signal strength from transducer 60 to determine whether an audible feedback to the animal should be given. If audible feedback is to be given 38 a tone is provided over speaker 42 to the animal. If the signal strength exceed the limit set by the trainer by the variable setting 50 a shock is administered 40 to the animal over electrode 44.

In this fashion the animal learns that pull too hard during a session results in negative reinforcement. Thus the animal learns not to pull.

A system and method for training of animals using a wireless device has been illustrated. It will be appreciated by those skilled in the art that certain of the background art provide the circuitry that contribute to the present invention. Other embodiments of the present invention are possible without departing from the scope of the invention as disclosed.

We claim:

1. A lead-less animal training device comprising:
a portable transmitter for transmitting a signal wherein the portable transmitter comprises a means for varying the power of the transmitted signal; and
an animal worn receiver wirelessly connected to the portable transmitter, the animal worn receiver comprising a physical encouragement means;
wherein the receiver is adapted to receive a signal from the transmitter indicative of the distance from the portable transmitter and is adapted to administer physical encouragement from the physical encouragement means when the distance becomes greater than a threshold level.

2. The lead-less animal training device 1 wherein the animal worn receiver further comprises;
a power source;
a signal strength meter connected to the power source for measuring the strength of the transmitted signal received;
a processor connected to the power source and connected to the signal strength meter for receiving the measured signal strength;
a shock producer connected to the power source and the processor;
The processor further comprising instructions for administering a shock to the animal when a shock threshold indicative of a first set signal strength is reached.

3. The lead-less animal training device of claim 2 further comprising a sound producer connected to the processor for producing an audible tone;
the processor further comprising instruction for generating the audible tone when a sound production threshold indicative of a second set signal strength is reached.

4. The lead-less animal training device of claim 3 wherein the sound production threshold is indicative of a signal strength stronger than the shock production threshold.

5. An apparatus for training an animal to stay within a predefined distance from a trainer regardless of whether the trainer is stationary or moving comprising:
a trainer device, the trainer device comprising a portable transmitter transmitting an RF signal at a frequency;
an animal worn device, the animal worn device comprising a receiver for receiving the RF signal;
a signal strength sensor in the animal worn device for sensing the RF signal strength as the animal wearing the animal worn device moves about;
a processor in the animal worn device connected to the signal strength sensor comprising instructions for administering an audible signal to the animal when the signal strength falls below a predefined first level and for administering an electrical stimulus to the animal when the signal strength falls below a second predefined level, the predefined levels of signal indicative of the distance from the trainer to the animal;
wherein the portable RF transmitter further comprises a variable setting means for variably setting the power of the RF signal transmitted.

6. The apparatus for training an animal to stay within a predefined distance from a trainer regardless of whether the trainer is stationary or moving of claim 5, wherein the portable RF transmitter continuously transmits the RF signal once the transmitter is turned on.

7. The apparatus for training an animal to stay within a predefined distance from a trainer regardless of whether the trainer is stationary or moving of claim 5, wherein the RF transmission level is programmable.

8. The apparatus for training an animal to stay within a predefined distance from a trainer regardless of whether the trainer is stationary or moving of claim 5, wherein the first and second signal strength levels of the animal worn device are programmable.

9. The apparatus for training an animal to stay a predefined distance from a trainer regardless of whether the trainer is stationary or moving of claim 5, wherein the portable transmitter further comprises a processor connected to a variable input means for variably setting the power of the RF signal.

10. A method for training an animal to stay within a predefined distance from a trainer regardless of whether the trainer is stationary or moving comprising:
setting an RF signal strength in a portable transmitter carried by a trainer;
transmitting at the RF signal strength set by the trainer;
receiving the RF signal by an animal worn device comprising a receiver;
determining the signal strength of the RF signal by a signal strength sensor in the animal worn device; and communicating the signal strength to a processor in the animal worn device, the processor adapted to administer an audible signal via a speaker in the animal worn device when the signal strength falls to a first level and further adapted to administer an electrical stimulus to the animal if the signal strength falls to a second level.

11. A method for training an animal to stay within a predefined distance from a trainer regardless of whether the trainer is stationary or moving comprising:

carrying by a trainer of a portable transmitter transmitting an RF signal;

receiving the RF signal by an animal worn device comprising a receiver;

determining the signal strength of the RF signal by a signal strength sensor in the animal worn device; and communicating the signal to a programmable processor in the animal worn device, the programmable processor adapted to administer an audible signal via speaker in the animal worn device when the signal strength falls to a first level and further adapted to administer an electrical stimulus to the animal if the signal strength falls to a second level.

12. The method for training an animal to stay within a predefined distance form a trainer regardless of whether the trainer is stationary or moving of claim 11, wherein the programmable processor is adapted to receive instructions for setting the first and second signal strength levels indicative of the distance between the trainer and the animal.

* * * * *